Figure 1:
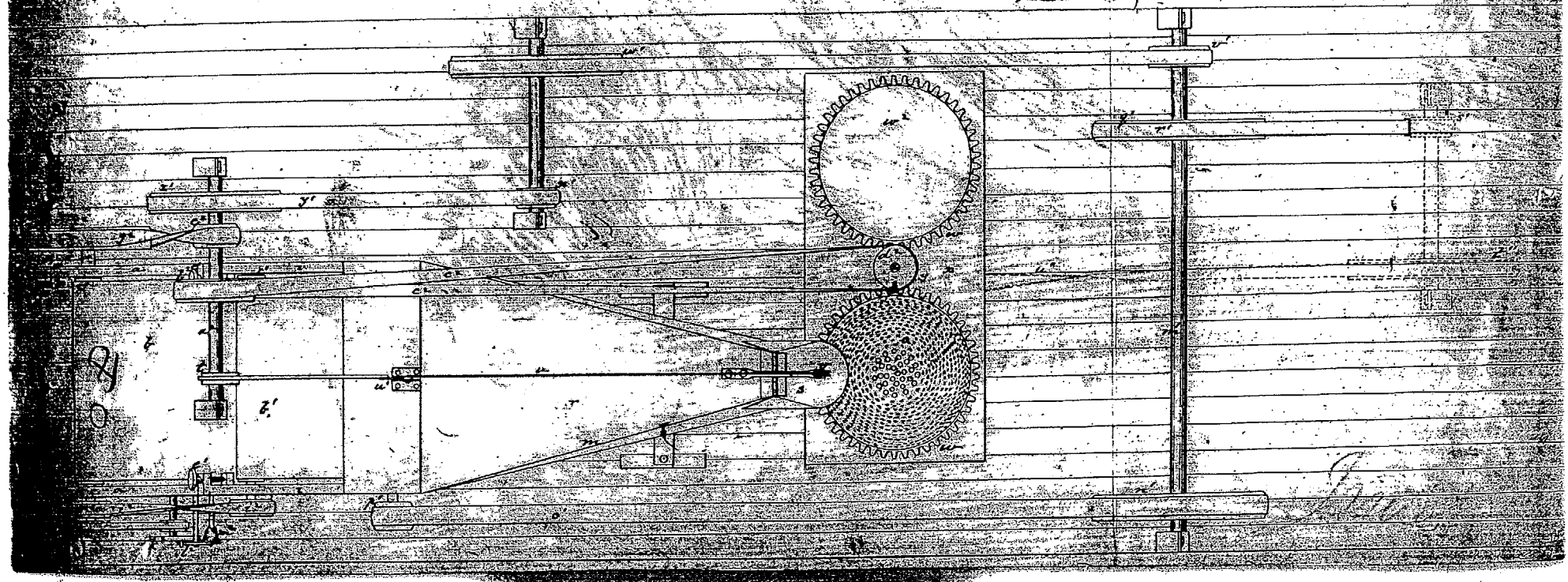

Felt & Felt
Forming Belts.

Forming Belts.

Case B

H. A. Wells. H. A. Barr — assignor

Setting up Hat Bodies — Patented Oct. 25, 1864.

Reissued Dec. 4, 1860.

Witnesses
Wm. Brown
Geo. Ho. Street.

H. A. Wells

Not found filed Feb. 8/60

Sheet 1 — 3 Sheets

In Reissue.

38

DIV. 16

38 — Division of Reissue.

No. 1087.

CLASSIFICATION
Re 1087
DIVISION.

THE NATIONAL ARCHIVES
NATIONAL ARCHIVES AND RECORDS SERVICE
GENERAL SERVICES ADMINISTRATION

H. A. Wells.
Forming Bats.
No. 1087 Reissued Dec. 4, 1860.
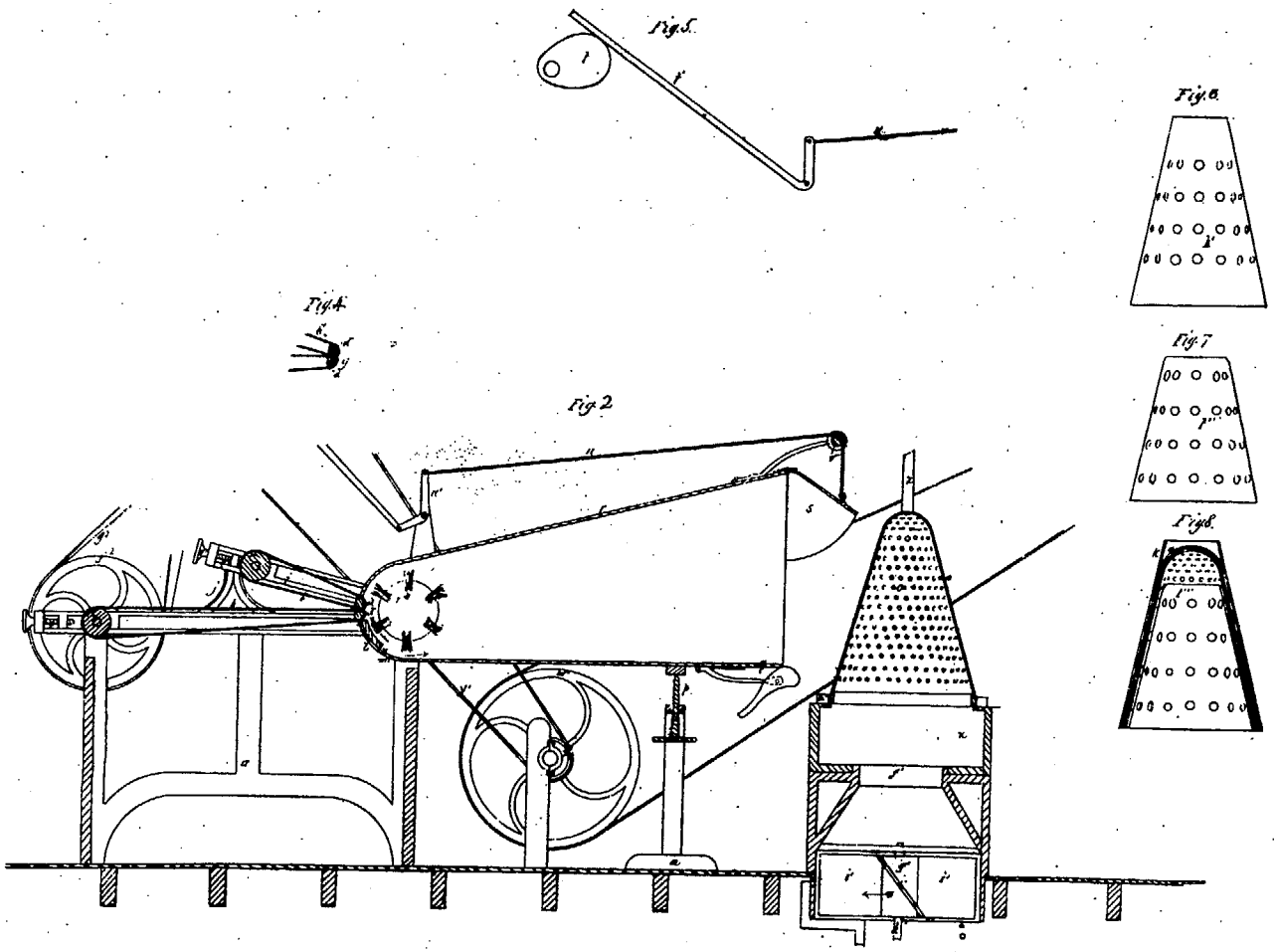
Witnesses
[illegible]
Assignee.
H. A. Wells H. A. Wells.
Forming Bals.
Sheet 3 - 3 Sheets
No. 1087
Reissued Dec. 4, 1860.
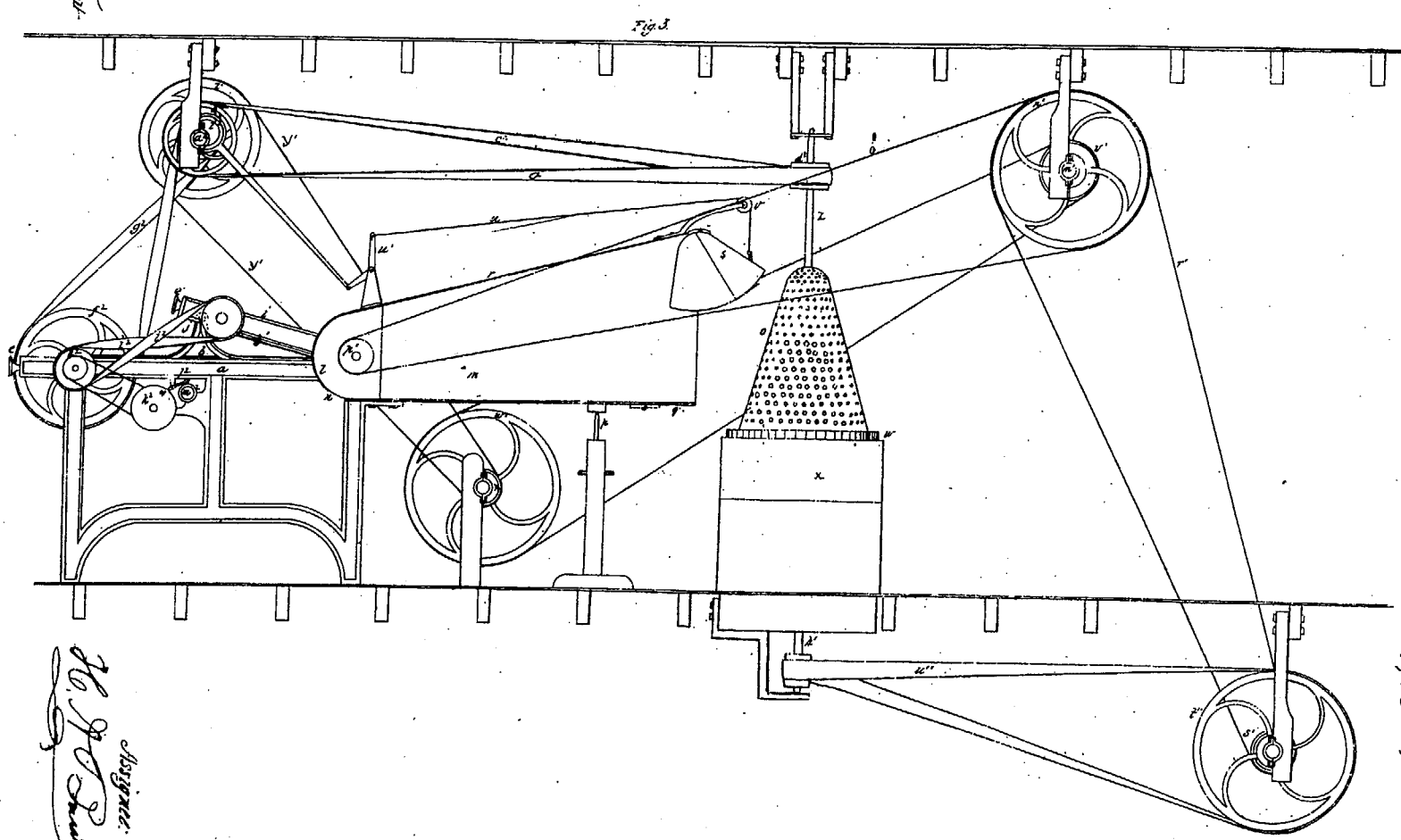
Witnesses:
Wm. H. Pike
Geo. H. Street
Assignee:
H. A. Wells

UNITED STATES PATENT OFFICE.

HENRY A. BURR, OF NEW YORK, N. Y., ASSIGNEE OF ELIZA WELLS, ADMINISTRATRIX OF H. A. WELLS, DECEASED.

IMPROVEMENT IN MACHINERY FOR MAKING HAT-BODIES.

Specification forming part of Letters Patent No. 4,472, dated April 25, 1846; Reissue No. 396, dated September 30, 1856; extended 7 years; Reissue No. 1,087, dated December 4, 1860.

DIVISION A.

*To all whom it may concern:*

Be it known that HENRY A. WELLS, late of the city, county, and State of New York, now deceased, did, in his life-time, invent certain new and useful Improvements in Machinery for Making Hat-Bodies of Fur, for which said improvements Letters Patent of the United States were granted to said WELLS, bearing date the 25th day of April, 1846; and I do hereby declare that the following is a full, clear, and exact description of the principle and character which distinguishes the said invention from all other things before known, and of the manner of making, constructing, and using the same, reference being had to the accompanying drawings, making part of this description, in which—

Figure 1 is a plan of the machine; Fig. 2, a longitudinal vertical section, and Fig. 3 a longitudinal elevation. The other figures will be described in their appropriate places.

The same letters indicate like parts in all the figures.

It has long been essayed to make hat-bodies by throwing the fibers of fur, wool, &c., from a carding-engine into the open air over a perforated cone, exhausted by a fan below, to draw down and hold the fibers thereon by the currents of air that rush from all directions toward and through the apertures of the cone, and thus to form a bat of fibers to be afterward held together by immersion in some glutinous composition; but from various causes all these attempts have failed. And a patent was granted to William Fosket, bearing date the 23d day of January, 1846, for a machine in which the fibers to be formed into a hat-body are drawn by suction through a tube into the lower part of a chamber surrounding a pervious cone or former, the inside of which is connected with an exhausting-fan to exhaust the air from the inside thereof to induce currents in the surrounding air to rush in all directions toward the outer surface of the pervious former and through the apertures thereof, and thus to carry the fibers from the lower part of the surrounding chamber toward and deposit and hold them on the outer surface of the said former.

Hat-bodies are required to be made thick at and near the rim, and thin along the crown and tip, that the required strength may be given where it is required, without making the hat too heavy and at too great a cost of material. This disposition of the fur can be obtained by the skill and judgment of the workman by the hand process, known under the name of "bowing," but cannot by the plans above referred to, for the reason that the fibers are only controlled by the currents induced through the apertures of the cone or other former by exhausting the air from the inside of it instead of being properly directed for distribution onto the surface of the cone or other former. When the fibers are not properly directed, but are drawn to the surface by the action of the exhaust, the force thus induced gradually decreases as the apertures in the cone are closed up by the accumulation of the fur deposited on the outer surface thereof, and in consequence the required distribution cannot be obtained.

The mode of operation of the said invention of the said HENRY A. WELLS is such that the fur fibers are directed and controlled so as to travel from the picking or disintegrating brush toward the surface of the pervious cone or other former, that they may be deposited thereon to the thickness required to make a bat of uniform thickness all around, and of the required varying thickness from brim to tip, and this mode of operation results from combining, with a rotary picking or disintegrating brush and a pervious cone or equivalent former, connected with an exhausting apparatus, suitable means for directing and controlling the fur-bearing current.

The said mode of operation, invented by the said HENRY A. WELLS, is embodied in the following description of the mode of application, reference being had to the accompanying drawings, in which—

*a* is a frame properly adapted to the operative parts of the machine, and *b* the lower feed-apron, on which the stock or fur is spread by the attendant in separate parcels, each sufficient for the formation of a hat, according to its intended weight. This apron, or endless belt of cloth, or other suitable material, passes around a roller, *c*, and a lip, *d*, the former at the back of the machine, with its bearings in sliding boxes, governed by set-screws *e e*, for the purpose of tightening the apron, and the latter near to the rotating brush *f*, and so formed as to present a slightly-rounded edge for the apron to pass over where it presents the fur to the action of the picker. Instead of this slightly-rounded edge, a small metallic roller may be substituted, but when this is done, the roller should be supported at different points between its end journals by letting it run in a circular groove in the lip, as represented in section at Fig. 4, where *g* indicates this roller. The fur, as it is carried along toward the lip *d*, is gradually compressed by the upper apron, *b'*, which passes around a feed-roller, *c'*, and lip *d'*, in manner similar to the under feed-apron. The roller *c'* runs in a frame, *i*, of which the lip *d'* forms part, hung on journals that rest in standards *j*, so that the lip *d'* can be made to press onto the fur between it and the under lip, *d*, and thus grip the fibers and present them to the effective action of the picker *f*. The under plane of the upper apron, *b'*, is inclined to the upper plane of the lower one, *b*, the more effectually to present the fibers in the proper manner to the picker. The roller *c'* of the upper apron runs in sliding boxes, governed by set-screws *c' e'*, and is placed forward of the journals of the frame, so that the tension of the belt $i^2$, which communicates motion from the lower roller, *c*, to the upper one, *c'*, may press the upper lip, *d'*, on the under lip, *d*, but this may be effected by means of springs, weights, or other well-known mechanical devices for making pressure under similar circumstances. The fibers, as they pass from the feed-aprons are acted upon by a brush, or picking or disintegrating brush *f*, that rotates with great velocity, and which is composed of parallel rows of stiff bristles projecting from a cylinder, but which may be differently constructed and composed, if desired. As the fibers are first presented, they are brushed and properly laid by the downward action of the brush, as indicated by the arrow, and when liberated are carried down the curved surface *l* of a chamber or tunnel, *m*, and at the lower edge of this they meet a current of air, that enters a narrow aperture, *e*, near the bottom of the chamber, and extending the whole length of the picking or disintegrating brush, which, being induced by the rotation of the picking or disintegrating brush and the partial vacuum in the perforated cone *o*, aids in carrying and giving direction to the fur-bearing current toward the surface of the perforated cone *o*. This chamber extends over and under the picking or disintegrating brush and the forward part of the lips, and turns on the journals of the brush, or is otherwise so arranged as to have a slight motion, the axis of which is the same as that of the brush. Its bottom rests on a set-screw, *p*, to regulate the delivery end of the chamber relatively to the cone. Its forward end, in addition to this, is provided with a hinged deflector, *q*, regulated by a cam-lever or other suitable means to regulate the delivery of the fibers at and near the base of the cone. The top *r* of this trunk is gradually elevated, and its sides are contracted to make the delivery-aperture nearly of the form of the cone, but narrower and higher, and its upper part is provided with a deflector, *s*, so curved as to correspond generally with the curve of the tip of the cone. This deflector is hinged to the upper part of the delivery-aperture of the chamber, and is connected with an eccentric, *t*, by means of a cord, *u*, that passes over a pulley, *v*, and which is attached to a bell-crank, *u*, so that each revolution of this eccentric carries the hood up and down to direct the discharge and distribute the fibers onto the cone, a greater thickness being desirable in the parts of the bat which form the brim than on the top and crown; and when it is desired still further to diversify the distribution of the fibers, other means can be substituted for the eccentric, and the connection between it and the deflector is formed, as represented in section at Fig. 5, where the cam *t* acts on the lever *t'*, connected by the cord *u*. The cone *o* is made in the usual manner, but of thin sheet metal, perforated, that being better than wire-guaze. Its lower edge fits in a metallic ring, *w*, that runs in an appropriate collar in the upper part of a case, *x*, and its outer periphery is provided with cogs that mesh into the cogs of a pinion, *y*, concealed in the drawings by the pulley $d^2$ on a vertical shaft, *z*, by which a slow rotary motion is given to the cone as the fibers are thrown onto it, to distribute them equally all around. The case *x* may be made sufficiently long to receive two rings, *w*—one on each side of the pinion, *y*—by which both are kept in motion, and it (the case) may be made to swivel on a hollow collar, *f'*, to which its bottom is fitted, so that when a bat is formed on one cone it may be turned aside by turning the case half a revolution, and another cone put onto the other ring, that another bat may be in the process of forming while the one already formed may be prepared for the hardening process, in the manner to be hereinafter described. The case *x* communicates through the hollow collar *f'* with an exhausting fan-blower, *g'*, which consists of a vertical arbor, *h'* with oblique vanes *i'*, so that when rotating with great velocity in the direction of the arrow the air is exhausted from the case *x* and the inside of the perforated cone *o*. When one of the cones is removed from one of the rings *w* to be taken to the hardening apparatus, the aperture in the ring *w* must be closed up with a cap-plate, $w^2$, to prevent the passage of air. Any other mode of exhausting the case and cone may be employed, but this is deemed the best.

All the operative parts may be set in motion by any of the known means—such as belts—as fully represented in the accompanying drawings, in which $m'$ is a main line-shaft overhead driven by any first mover. From a wheel, $n'$, on it, a band, $o'$, extends to a pulley, $p'$, on the shaft of the brush, which should make about two thousand revolutions per minute, more or less. From another wheel, $q'$, on this same shaft, a band, $r'$, extends to a pulley, $s'$, on the shaft of which there is a wheel, $t''$, that drives the exhaust-fan $g'$ by the belt $u''$, and from a pulley, $v'$, on the same line-shaft, a belt extends to a wheel, $w'$, on the shaft of which there is a pulley, $x'$, from which extends another belt, $y'$, to a wheel, $z'$, on the shaft $a^2$, that carries the eccentric $t$, to give all the reduced motions required for the other parts of the machinery. From a wheel, $b^2$, on this shaft a belt, $c^2$, extends to a pulley, $d^1$, on the shaft $z$ that rotates the cone $o$, and another pullly, $e^2$, drives the wheel $f^2$ of the feed-roller $c$ by the belt $g^2$; and on the other end of the axle of this feed-roller there is a pulley, $h^2$, which drives, by across belt, $i^2$, the upper feed-roller, $c'$. If desired, an alarm can be connected with the feed-roller of the lower apron to announce to the attendant when each charge of stock is exhausted, that the cones may be shifted. This can be done by connecting the arbor of the feed-roller $c$ of the lower feed-apron by a belt with a wheel, $k^2$, provided with a cam or pin to lift at every revolution the hammer $l^2$ of a bell, $m^2$, the striking of which shall give requisite indication.

It will be obvious from the foregoing that the upper deflector, $s$, may be operated or adjusted by hand, instead of machinery, thus substituting the attention, skill, and cost of an operative for the positive regularity and cheapness of mechanical movements.

The preparation of the formed bat for hardening is effected by covering it with pieces of felt or fulled cloth just taken from hot water, and this is done in the following manner—viz: The attendant takes from a kettle of hot water a piece of felt cloth, rolled up on a roller, and applies one end of it to the surface of the bat, and as the cone rotates the felt cloth winds from the roller onto the bat on the cone. Another piece of felt cloth is put on the top, and then a strong perforated metallic cone, $k'$, (see Fig. 6) is put over the whole, the more effectually to hold the fibers of the bat, and to make a slight pressure on them while it is immersed in hot water to harden. As the perforated cone $o$ is better when made very thin, the pressure of the water when drawing it out of the kettle, after the bat has been hardened, tends to and would collapse it, and therefore, to prevent this, another perforated metallic cone, $t'''$, (see Fig. 7,) is put inside (before the whole is immersed in hot water) to sustain the pressure in drawing the whole out of the hardening-kettle. The relative situation of the three cones, the bat, and the covering of felt cloth, preparatory to the hardening process, is represented on an enlarged scale at Fig. 8, which is a vertical section through the whole. The inner sustaining-cone may be dispensed with, if desired, by making the cone $o$ of greater thickness and strength.

Having thus described the mode of application of the said invention of the said HENRY A. WELLS, as the same was successfully reduced to practice by him, I do not wish to be understood as limiting the claim of my invention to such mode of application, as other modes may be devised having the same mode of operation or principle, and only differing from it in form or in the substitution of equivalent means. Nor do I wish to be understood as making claim herein to the combined process of forming and of hardening hat-bodies on pervious cones or other analogous formers, preparatory to taking them off in a suitable condition for the after process of sizing by felting, as this is the subject of another patent.

What I claim as the invention of the said HENRY A. WELLS, in machinery for forming bats of fur fibers, in the manufacture of fur hat-bodies, is—

1. The mode of operation, substantially as herein described, of forming bats of fur fibers of the required varying thickness from brim to tip, which mode of operation results from the combination of the rotating picking mechanism, or the equivalent thereof, the pervious former and its exhausting mechanism, or the equivalent thereof, and the means for directing the fur bearing current, or the equivalent thereof, as set forth.

2. The combination of the rotating picking mechanism, or the equivalent thereof, the pervious former with its exhausting mechanism, and the lower deflector, substantially as described, to regulate the deposit of the fur fibers on the lower part of the former, as described.

3. The combination of the rotating picking mechanism, or the equivalent thereof, the pervious former with its exhausting mechanism, and the upper deflector, substantially as described, to regulate the deposit of the fur fibers on the tip of the pervious former, as set forth.

4. The combination of the rotating picking mechanism, the pervious former with its exhausting mechanism, and the means described, or the equivalent thereof, for inducing a current of air to aid in carrying and giving direction to the fur and insuring its proper deposit on the surface of the pervious former as required, as set forth.

H. A. BURR.

Witnesses:

ANDREW DE LACY,
GEO. H. STREET.